(12) United States Patent
Knoop

(10) Patent No.: US 8,922,037 B2
(45) Date of Patent: Dec. 30, 2014

(54) WIND ENERGY SYSTEM HAVING BUSBARS

(75) Inventor: Frank Knoop, Aurich (DE)

(73) Assignee: Aloys Wobben, Aurich (DE)

( * ) Notice: Subject to any disclaimer, the term of this patent is extended or adjusted under 35 U.S.C. 154(b) by 1028 days.

(21) Appl. No.: 12/937,949

(22) PCT Filed: Apr. 9, 2009

(86) PCT No.: PCT/EP2009/054296
§ 371 (c)(1),
(2), (4) Date: Jan. 14, 2011

(87) PCT Pub. No.: WO2009/127592
PCT Pub. Date: Oct. 22, 2009

(65) Prior Publication Data
US 2011/0140446 A1 Jun. 16, 2011

(30) Foreign Application Priority Data

Apr. 15, 2008 (DE) .......................... 10 2008 018 790

(51) Int. Cl.
*F03D 9/00* (2006.01)
*H02P 9/04* (2006.01)

(52) U.S. Cl.
USPC .............................................. 290/44; 290/55

(58) Field of Classification Search
CPC ... E04H 12/085; F03D 11/0066; H02G 5/025
USPC ............. 290/44, 55; 415/4.1, 4.2; 174/126.1; 52/745.17, 745.18
See application file for complete search history.

(56) References Cited

U.S. PATENT DOCUMENTS

| 2,106,557 | A |   | 1/1938 | Putnam ........................... 290/44 |
| 2,941,026 | A |   | 6/1960 | Lambert ......................... 174/71 |
| 3,263,131 | A | * | 7/1966 | Rowe ............................ 361/675 |
| 3,265,934 | A |   | 8/1966 | Cuttino ........................... 317/99 |

(Continued)

FOREIGN PATENT DOCUMENTS

| CA | 2 463 950 | 7/2005 |
| CN | 1320272 | 6/2007 |

(Continued)

OTHER PUBLICATIONS

Pempeintner, "Offshore siting of large wind energy converter systems in the German North Sea and Baltic regions," *Modern Power Systems*, 4 (6): 33-40, Jun. 1984.

(Continued)

*Primary Examiner* — Julio Gonzalez
(74) *Attorney, Agent, or Firm* — Seed IP Law Group PLLC

(57) ABSTRACT

A wind power installation is provided having a pylon made up of a plurality of pylon segments, a generator arranged in the region of the head of the pylon, a power module arranged in the region of the pylon base or separate from the pylon, busbar elements which are installed segmented in the associated pylon segments for current transfer from the generator to the power module, and connecting elements for connecting busbar elements which are installed in adjacent pylon segments. Clamping holders may be mounted to the inside wall in the end region, that is the lower end region in the erected condition, of the pylon segments with end portions of the busbar elements clamped or inserted into the clamping holders.

13 Claims, 4 Drawing Sheets

(56) References Cited

U.S. PATENT DOCUMENTS

| | | | |
|---|---|---|---|
| 3,541,224 A * | 11/1970 | Joly | 174/72 C |
| 3,768,016 A | 10/1973 | Townsend et al. | 455/25 |
| 3,913,003 A | 10/1975 | Felkel | 321/8 R |
| 3,952,467 A | 4/1976 | Partlow | 52/121 |
| 3,958,376 A | 5/1976 | Campbell | 52/115 |
| 4,050,246 A | 9/1977 | Bourquardez | 60/398 |
| 4,090,233 A | 5/1978 | Thiele et al. | 363/68 |
| 4,134,707 A | 1/1979 | Ewers | 415/4 |
| 4,272,929 A | 6/1981 | Hanson | 52/296 |
| 4,291,233 A | 9/1981 | Kirschbaum | 290/1 C |
| 4,357,542 A | 11/1982 | Kirschbaum | 290/44 |
| 4,386,487 A | 6/1983 | Scott | 52/184 |
| 4,488,696 A | 12/1984 | Sauber | 248/74.1 |
| 4,673,822 A | 6/1987 | Kikuchi | 290/44 |
| 4,710,850 A | 12/1987 | Jahn et al. | 361/333 |
| 4,777,686 A | 10/1988 | Muller | 14/1 |
| 4,799,279 A | 1/1989 | Muller | 14/1 |
| 4,813,193 A | 3/1989 | Altizer | 52/210 |
| 4,887,397 A | 12/1989 | Peterson | 52/86 |
| 4,966,525 A | 10/1990 | Nielsen | 416/9 |
| 5,063,473 A | 11/1991 | Hall et al. | 361/93 |
| 5,075,564 A | 12/1991 | Hickey | 290/55 |
| 5,254,876 A | 10/1993 | Hickey | 290/55 |
| 5,506,453 A | 4/1996 | McCombs | 290/44 |
| 5,794,387 A | 8/1998 | Crookham | 274/517 |
| 5,808,368 A | 9/1998 | Brown | 290/53 |
| 5,853,305 A * | 12/1998 | Bedrossian et al. | 439/787 |
| 5,865,282 A | 2/1999 | Glück | 191/22 DM |
| 5,951,340 A * | 9/1999 | Mueller et al. | 439/891 |
| 6,007,350 A * | 12/1999 | Isshiki | 439/76.2 |
| 6,023,105 A | 2/2000 | Youssef | 290/54 |
| 6,157,088 A | 12/2000 | Bendix | 290/55 |
| 6,203,343 B1 * | 3/2001 | Chevassus-More et al. | 439/210 |
| 6,400,039 B1 | 6/2002 | Wobben | 290/44 |
| 6,408,575 B1 | 6/2002 | Yoshida et al. | 52/40 |
| 6,425,708 B1 | 7/2002 | Siegfriedsen | 405/154.1 |
| 6,439,832 B1 | 8/2002 | Siegfriedsen | 415/4.3 |
| 6,457,281 B1 | 10/2002 | Teron | 52/79.14 |
| 6,467,233 B1 | 10/2002 | Maliszewski et al. | 52/720.1 |
| 6,470,645 B1 | 10/2002 | Maliszewski et al. | 52/745.18 |
| 6,532,700 B1 | 3/2003 | Maliszewski et al. | 52/40 |
| 6,713,891 B2 | 3/2004 | Kirkegaard et al. | 290/44 |
| 6,868,646 B1 | 3/2005 | Perina | 52/745.17 |
| 6,979,171 B2 | 12/2005 | Lauritsen | 415/4.3 |
| 7,029,576 B2 | 4/2006 | Siegfriedsen | 210/153 |
| 7,061,133 B1 | 6/2006 | Leijon et al. | 290/44 |
| 7,144,216 B2 | 12/2006 | Hessel | 415/119 |
| 7,199,485 B2 * | 4/2007 | Wobben | 290/55 |
| 7,722,372 B2 * | 5/2010 | Matsumoto et al. | 439/213 |
| 2001/0010977 A1* | 8/2001 | Murakami | 439/76.2 |
| 2002/0012582 A1 | 1/2002 | Kirkegaard et al. | 415/4.3 |
| 2003/0151260 A1 | 8/2003 | Siegfriedsen | 290/44 |
| 2004/0050760 A1 | 3/2004 | Siegfriedsen | 210/97 |
| 2004/0081551 A1 | 4/2004 | Wobben | 415/4.1 |
| 2004/0094965 A1 | 5/2004 | Kirkegaard et al. | 290/55 |
| 2004/0103655 A1 | 6/2004 | Lauritsen | 60/398 |
| 2004/0131467 A1 | 7/2004 | Wobben | 416/132 B |
| 2004/0169376 A1 | 9/2004 | Ruer et al. | 290/55 |
| 2004/0262926 A1 | 12/2004 | Hansen | 290/44 |
| 2005/0042099 A1 | 2/2005 | Wobben | 416/132 B |
| 2005/0129504 A1 | 6/2005 | De Roest | 415/4.2 |
| 2005/0134050 A1 | 6/2005 | Salls, Jr. | 290/54 |
| 2005/0175451 A1 | 8/2005 | Wobben | 416/31 |
| 2005/0230980 A1 | 10/2005 | Brunet | 290/44 |
| 2005/0286996 A1 | 12/2005 | Tsai | 415/4.2 |
| 2006/0013689 A1 | 1/2006 | Wobben | 416/132 B |
| 2006/0082160 A1 | 4/2006 | Lee | 290/55 |
| 2006/0115363 A1 | 6/2006 | Schellstede | 416/244 R |
| 2006/0120809 A1 | 6/2006 | Ingram et al. | 405/195.1 |
| 2006/0233645 A1 | 10/2006 | Wobben | 416/132 B |
| 2006/0236648 A1 | 10/2006 | Grundman et al. | 52/726.4 |
| 2006/0267348 A1 | 11/2006 | Weitkamp et al. | 290/55 |
| 2006/0277843 A1 | 12/2006 | Livingston et al. | 52/110 |
| 2007/0001464 A1 | 1/2007 | Kothnur et al. | 290/55 |
| 2007/0010112 A1* | 1/2007 | Makino | 439/76.2 |
| 2007/0085345 A1 | 4/2007 | Brown et al. | 290/44 |

FOREIGN PATENT DOCUMENTS

| | | | |
|---|---|---|---|
| DE | 706 290 | 5/1941 | |
| DE | 33 21 441 | 5/1984 | |
| DE | 3321441 A1 * | 5/1984 | H02B 1/20 |
| DE | 43 25 570 | 2/1994 | |
| DE | 94 17 738 | 12/1994 | |
| DE | 44 36 197 | 4/1996 | |
| DE | 196 09 006 | 4/1997 | |
| DE | 198 16 483 | 10/1999 | |
| DE | 198 32 921 | 2/2000 | |
| DE | 198 60 211 | 11/2000 | |
| DE | 199 62 453 | 7/2001 | |
| DE | 100 13 442 | 10/2001 | |
| DE | 10 2006 031 763 | 1/2008 | |
| EP | 0 793 324 | 9/1997 | |
| EP | 0 933 855 | 8/1999 | |
| EP | 0 959 546 | 11/1999 | |
| EP | 1 036 937 | 9/2000 | |
| EP | 1 444 436 | 8/2004 | |
| ES | 2 275 949 | 6/2007 | |
| GB | 1 432 566 | 4/1976 | |
| GB | 2 224 294 | 5/1990 | |
| JP | 41-24905 | 12/1966 | |
| JP | 56-92370 | 7/1981 | |
| JP | 3068946 | 5/2000 | |
| JP | 2000-283018 | 10/2000 | |
| JP | 2001-346359 | 12/2001 | |
| JP | 2001-349775 | 12/2001 | |
| JP | 2002-70720 | 3/2002 | |
| JP | 2003-286938 | 10/2003 | |
| WO | 99/29025 | 6/1999 | |
| WO | 99/30031 | 6/1999 | |
| WO | 00/36724 | 6/2000 | |
| WO | 01/77527 | 10/2001 | |
| WO | 03/036084 | 5/2003 | |
| WO | 2008/003680 | 1/2008 | |

OTHER PUBLICATIONS

Spera, *Wind Turbine Technology Fundamental Concepts of Wind Turbine Engineering*, ASME Press, New York, 1994, Chapter 2, "Introduction to Modern Wind Turbines," pp. 47-72.

Wind-Kraft & Natürliche Energien Journal, "First type testing at KGW Schwerin," pp. 66-67, edition Mar. 2001. (+Translation).

* cited by examiner

WIND ENERGY SYSTEM HAVING BUSBARS

BACKGROUND

1. Technical Field

This disclosure concerns a wind power installation and, more particularly, a wind power installation comprising a pylon made up of a plurality of pylon segments.

2. Description of the Related Art

The electric power module of a typical wind power installation which includes electric units such as transformers, switch cabinets, optionally inverters, medium-voltage installation, low-voltage distribution and so forth, is generally arranged in wind power installations beneath the generator plane and frequently in the region of the base of the pylon of the wind power installation or separate from the pylon, for example on the mainland in the case of an offshore wind power installation. Generally a dedicated small building is provided outside the wind power installation for such components or for some of those components, but those components may also be set up within the pylon, for example, on a foundation.

To transmit electric energy generated by the generator arranged in the region of the top of the tower within a pod to the power module, there are typically provided current conductors which generally extend within the pylon and are in the form of cables. Those cables are usually introduced into the pylon after it has been erected. That is a complicated and expensive procedure as the cables are installed over the entire height of the pylon in a separate working operation. In addition, that working operation is dependent on the previous erection of the pylon.

International Patent Application Publication No. WO 03/036084 describes a wind power installation in which the current conduction means which are preferably cable ducts or busbars are pre-installed in segmented fashion in the pylon segments. In a configuration of that wind power installation the current conducting means are fixedly connected to the associated pylon segments only at one point, preferably in the region which is the upper region in the erected condition, so that they admittedly hang fixedly but are still mounted movably to some degree to the inside wall of the pylon segment.

BRIEF SUMMARY

The present disclosure concerns a wind power installation and, more particularly, a wind power installation comprising a pylon made up of a plurality of pylon segments, a generator arranged in the region of the head of the pylon, a power module arranged in the region of the pylon base or separate from the pylon, busbar elements which are installed segmented in the associated pylon segments for current transfer from the generator to the power module, and connecting elements for connecting busbar elements which are installed in adjacent pylon segments. The busbar elements and connecting elements may be pre-installed. The present disclosure further concerns a corresponding pylon segment for such a wind power installation.

An embodiment provides a wind power installation which can be more easily and thus also more conveniently and more quickly erected.

According to an embodiment, a wind power installation is provided with clamping holders mounted to an inside wall in the end region, that is the lower end region in the erected condition, of the pylon segments and busbar elements are installed in the respectively associated pylon segments with end portions of the busbar elements clamped or inserted into the clamping holders.

The segments of the busbar elements may thus be prefabricated and so mounted to the respective pylon segments that the end portions thereof, in the region of the pylon segment that is the lower region in the erected condition, are clamped or inserted into the clamping holders in such a way that they are already oriented into a position in order to be connected to the adjacent pylon segment. There is therefore no need for cables to be pulled through the pylon after erection thereof, which is a complicated operation, in order to electrically connect the generator and the power module together, nor do cables which are already pre-installed at a point have to be properly oriented and further secured in position when constructing the pylon. The clamping holders provided according to an embodiment also permit simple rapid pre-assembly of the busbar elements in the associated pylon segments and in addition also afford adequate transport safety when transporting the pylon segments.

At any event, in comparison with some previously known wind power installations the measures according to an embodiment make it possible to shorten the total erection time for the wind power installation and to reduce the erection costs without noticeable technical disadvantages having to be tolerated.

Advantageous configurations of the wind power installation according to embodiments are recited in the appendant claims.

In some embodiments, connecting elements are a respective part of a busbar element and can thus also be installed therewith. In other embodiments, they are parts which are separate from the busbar elements.

Connecting elements are used according to an embodiment to connect the busbar elements after erection of the pylon insofar as those elements do not extend directly to each other and/or are parts of a busbar element or if gaps or other obstacles between the busbar elements, for example a flange for connecting two pylon segments, have to be bridged over.

According to one embodiment, the connecting elements are respectively arranged at the end portion, that is the lower end portion in the constructed condition, of the busbar elements of an associated pylon segment. Such a structure makes it possible to use a portion which is short as a connecting element and/or a short portion of the busbar elements, and thus save on material. In that case in addition there is no longer any need for separate connecting elements which would still have to be separately fitted after the pylon was constructed.

Alternatively or additionally the connecting elements can also be respectively arranged at the end portion, that is the upper end portion in the constructed condition, of the busbar elements of an associated pylon segment.

In another embodiment, at least one end portion of the connecting elements can be respectively clamped or fitted together with a respective end portion, in particular the upper end portion, of the busbar elements. Such a configuration is advantageous insofar as that affords a (mechanical or electric) connection of a connecting element to one or two busbar elements without having to use additional fixing means.

In another embodiment, the connecting elements are so biased that a free end lies against or is pressed against an end portion of the busbar elements. Such a configuration also permits a connecting element to be connected to a busbar element without additional fixing means. In particular with this configuration it is possible to achieve enhanced stability as in particular pressing the connecting elements against the end portions of the associated busbar elements, which is preferably effected in the direction of the inside wall of the pylon, prevents the busbar elements from falling over into the interior of the pylon.

In another embodiment, the connecting elements are bent or angled from the inside wall of the pylon into the interior thereof to bridge over at least one flange of two adjacent pylon segments. Such a configuration makes it possible to bridge over obstacles between two busbar elements, for example two flanges for connecting the two pylon segments.

In another embodiment the busbar elements in the constructed condition are additionally secured to prevent them from falling over by means of holding elements in the upper end region of the associated pylon segment. Such a configuration permits the busbar elements to remain in the same relative position with respect to each other in the event of severe pylon oscillations.

A further aspect of an embodiment is a pylon segment for a wind power installation which is characterized in that clamping holders are mounted to the inside wall in the end region, that is the lower end region in the erected condition, of the pylon segment and that the busbar elements are thereby installed in the pylon segment so the end portions of the busbar elements are clamped or inserted into the clamping holders.

In order on the one hand to protect the maintenance personnel from contact with the busbars when climbing up the pylon through the interior thereof and to ensure electrical insulation and on the other hand to protect the busbars from damage, in a further embodiment there is provided a protective casing, in particular a protective plate, which for example is fixedly connected to the inside wall of the pylon and protects the busbars entirely from contact. That protective casing can also be divided into individual segments which may be pre-installed to the pylon segments, like the busbar elements. That provides for a further reduction in time and a further simplification in erecting the wind power installation.

DETAILED DESCRIPTION

Figure 1:
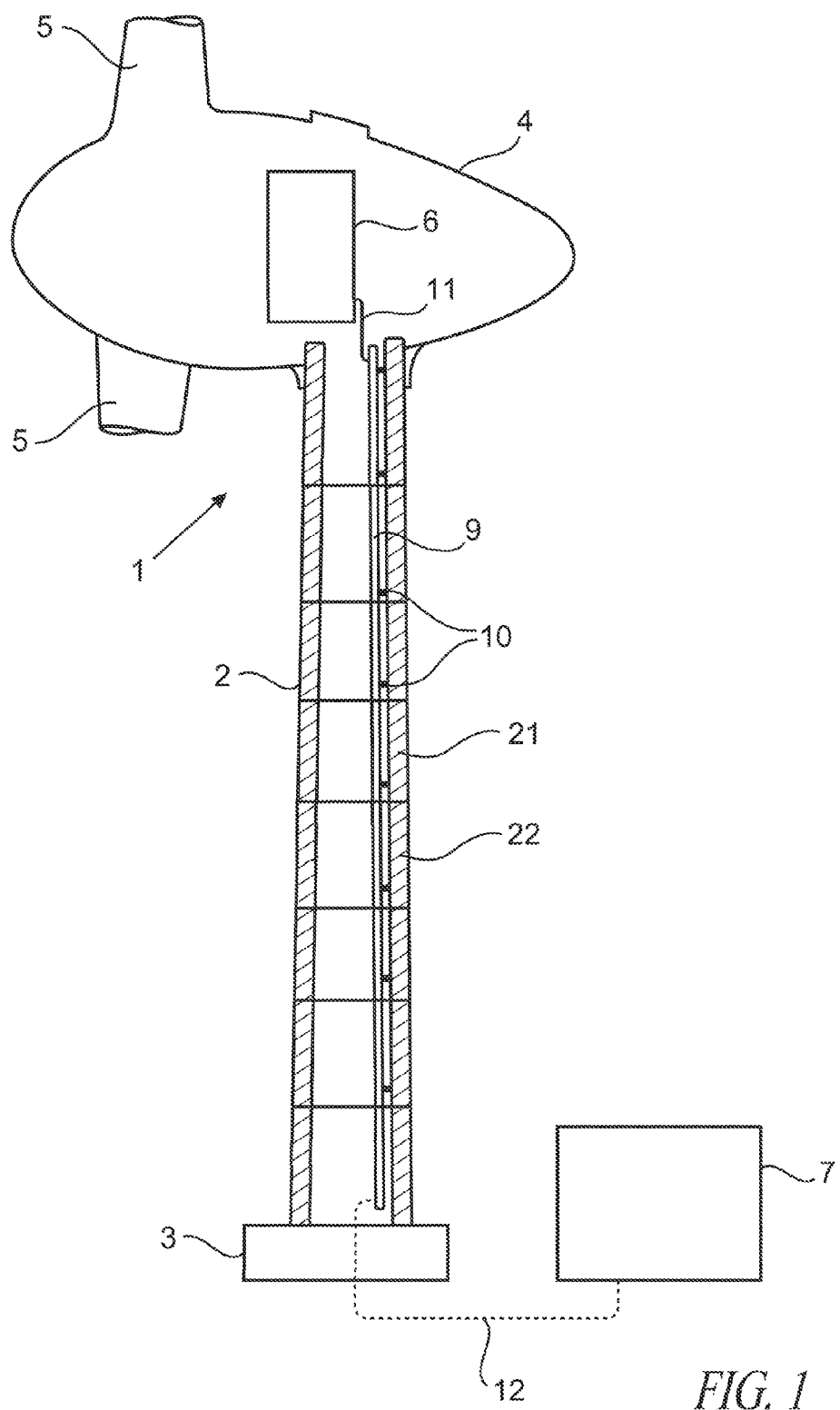
FIG. 1 shows a view of a wind power installation according to an embodiment.

The wind power installation 1 according to an embodiment as diagrammatically shown in FIG. 1 has a pylon 2 having a foundation 3, a pod 4 mounted rotatably in the region of the tip or head of the pylon 2 and a power module 7 arranged in the region of the pylon base, for example in a separate cabin. Arranged within the pod 4 is a rotor mounted rotatably about a horizontal axis, having a plurality of rotor blades 5 which are only basically shown, as well as an electric generator 6. The wind forces acting on the rotor blades 5 cause the rotor to rotate and drive the generator 6 to generate electric energy.

According to an embodiment, busbars 9, preferably two, three or four busbars 9, are provided for transmission of the energy generated by the generator 6 to the power module 7, which includes numerous electric units such as a transformer or optionally an inverter for further processing of the electric current before it is fed into the network or passed to a consumer. The busbars 9 are electrically conducting and are electrically connected by way of a cable 11 to the generator and by way of a connecting line 12 which preferably passes, according to one embodiment, through the foundation 3 and the ground therebeneath, to the power module 7.

The pylon 2 is diagrammatically shown in a sectional view, and two pylon segments 21 and 22 are identified by way of example. A clamping holder 10 is arranged in the lower region of a respective pylon segment, that is to say also in the respective lower region of each of the pylon segments 21 and 22, for holding busbar elements of the busbar 9. FIG. 1 is only intended to provide an overview of the position of the busbar 9 and the subdivision of the busbar 9 into individual busbar elements, and therefore is not shown in greater detail in FIG. 1 for that reason.

Figure 2:
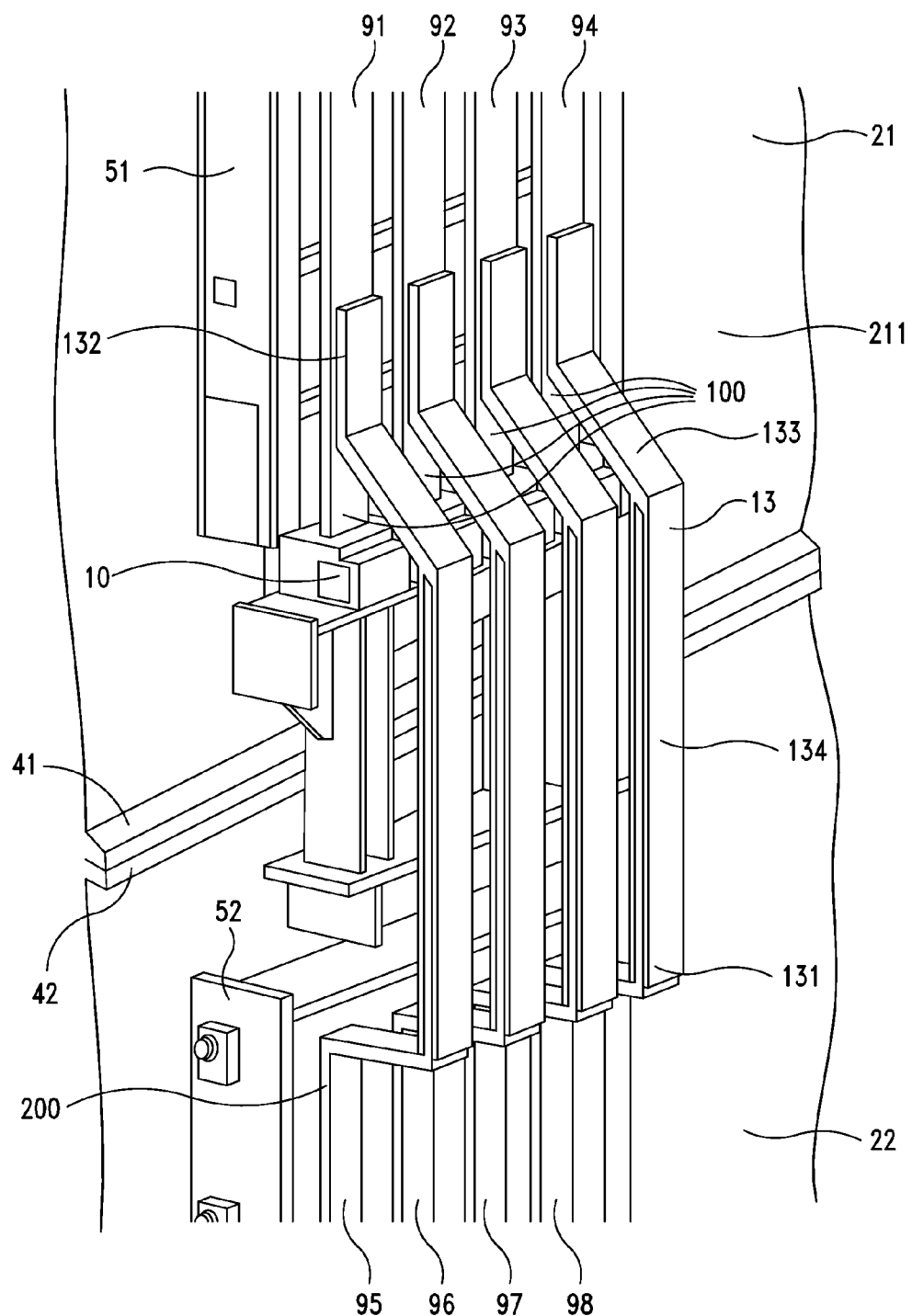
FIG. 2 shows a perspective view of busbar elements and two pylon segments.

FIG. 2 shows a perspective view of a portion of a pylon of a wind power installation according to an embodiment. Two pylon segments 21, 22 of the pylon 2 are diagrammatically shown there. Such pylon segments 21, 22 can comprise for example steel or also concrete. In relation to the pylon segment 21, by way of example busbar elements 91-94 are shown here, while busbar elements 95-98 are shown in relation to the pylon segment 22.

The pylon segments 21, 22 are indicated only diagrammatically and in respect of a portion thereof. In this case the two pylon segments 21, 22 are connected together by two flanges 41, 42. Those flanges 41, 42 are also only diagrammatically shown and in particular the screws and nuts usually employed for making the connection are not illustrated. It can be seen from FIG. 2 that the busbar elements 91-94 are guided coming from above over the flanges 41, 42 and continue to extend as busbar elements 95-98 beneath the flanges 41, 42. FIG. 2 further shows guide elements 51, 52 in the region of the upper and lower pylon segments 21 and 22 respectively. Those guide elements can on the one hand represent a guide for the busbar elements 91-94 and 95-98 respectively and at the same time provide a spacing relative to the respective pylon segment 21 and 22 respectively.

Those pylon segments 21, 22 may be prefabricated and assembled to form the pylon 2 at the location of the wind power installation 1. To shorten the erection time and to simplify the work and thus also to reduce the costs of the overall wind power installation the busbar elements 91-94 of the pylon segment 21 may be respectively preassembled by means of a clamping holder 10 which is disposed in the end region 211, that is the lower end region in the constructed condition, of the associated pylon segment 21, and into which the end portions 100 of the busbar elements 91-94 are clamped or inserted. Such a configuration affords the advantage that the busbar elements are so firmly connected to the respectively associated pylon segments that in transport of preassembled pylon segments to the building location for the wind power installation, they do not fall apart nor can they become wedged into each other.

That construction also permits compensation in respect of relative movements between the pylon 2 and the busbar elements 91-94, for example as a consequence of different coefficients of expansion and decoupling of the busbars from the pylon movements, for example due to wind pressure and so forth. To electrically connect the busbar elements 91-94 to the busbar elements 95-98 and in that case to bridge over parts which are possibly present and project into the interior, such as for example flanges 30 at the lower and/or upper end region of the pylon segments 21, 22, connecting elements 13 are used, which can compensate for expansion or contraction of material, for example due to temperature fluctuations or by virtue of pylon oscillations.

The connecting elements 13 can respectively be separate parts or however, as is not shown, a respective part of a corresponding busbar element.

In the illustrated embodiment of FIG. 2, the connecting elements 13 and in particular the upper end portions 132 thereof may be respectively fixedly pre-installed, for example by welding or screwing, at the end portion 100, that is the lower end portion in the constructed condition, of the busbar elements 91-94 of the pylon segment 21, with a galvanic connection thereto. To bridge over the flanges 41-42 or other obstacles, the connecting elements 13 in their transitional region 133 are angled away from the inside wall of the pylon into the interior thereof until they again extend parallel to the inside wall of the pylon, in a central region 134. There, in the illustrated embodiment, the connecting elements 13 are each of a U-shaped configuration by being bifurcated and have two plate-shaped portions extending in mutually parallel relationship at a small spacing. In the end region 131 thereof the connecting elements 13 are then fitted in the assembled condition on to the upper end portions 200 of the busbar elements 95-98 of the lower pylon segment 22 so that this affords a mechanical and electric connection between the busbar elements 95-98 and 91-94 by way of the connecting elements 13.

Preferably the two plate-shaped portions, that extend in mutually parallel relationship, of the U-shaped central and end regions 134, 131 of the connecting elements 13 are somewhat biased relative to each other so that they afford a good clamping connection between the connecting elements 13 and the end portions 200 of the busbar elements 95-98. A further mechanical connection of the end portions 131 to the end regions 200, for example by means of screwing or by welding, is thus optional. The omission of such a mechanical connection between the end regions 200 of the busbar elements 95-98 and the end portions 131 of the connecting elements 13 even allows a relative movement relative to each other so that pylon movements causing same can be compensated.

The upper end portions 200 of the busbar elements, as is shown for the busbar elements 95-98, are also each of an angled configuration to permit simple assembly by insertion into the forked end regions of the U-shaped connecting elements 13.

With that design configuration the connecting elements 13 are already fixedly installed to the lower end portions 100 of the busbar elements 91-94, which in turn are already inserted or clamped into the clamping elements 10. Other design configurations however are also conceivable. For example the connecting elements 13 can already be from the outset an integral constituent part of the busbar elements 91-94. In addition the connecting elements 13 can also be of other shapes, for example they may involve other angled configurations or rounded configurations, and they could each be fixedly pre-assembled to the upper end portions 200 of the busbar elements 95-98 so that, upon construction of the pylon, they can then be connected to corresponding counterpart portions mounted on the lower end portions of the busbar elements 91-94.

In addition, the configuration of the connection does not have to be effected by forked end regions of a U-shaped configuration, as shown in FIG. 2. In principle, any kind of connection is possible, wherein preferably simple clamping or plugging connections are used which permit assembly in the simplest possible fashion, with at the same time a good mechanical and electric connection, and allow a relative movement of the busbar elements 91-94, 95-98 mounted in adjacent pylon segments, relative to each other.

In addition, further embodiments provide that the connecting elements 13 in their entirety are each fixedly installed to the upper end portions 200 of the busbar elements or are an integral constituent part of the busbar elements there. With such a design configuration the connecting elements 13 are preferably biased towards the inside wall of the pylon so that after assembly of the pylon segments 21 and 22, the upper end regions 132 press against the lower end portions 100 of the busbar elements 91-94 so that additional fixing or connecting means such as for example screws or a weld are not necessarily required there to provide a good mechanical and electric connection. Alternatively connecting elements 13 of a corresponding configuration can also be mounted to the lower end portions 100 of the busbar elements 91-94, which then after assembly of the pylon segments 21, 22 press against the upper end portions 200 of the busbar elements 95-98. That configuration also has the advantage that the busbar elements 95-98 are thereby secured at the same time to prevent them from falling over.

Figure 3:
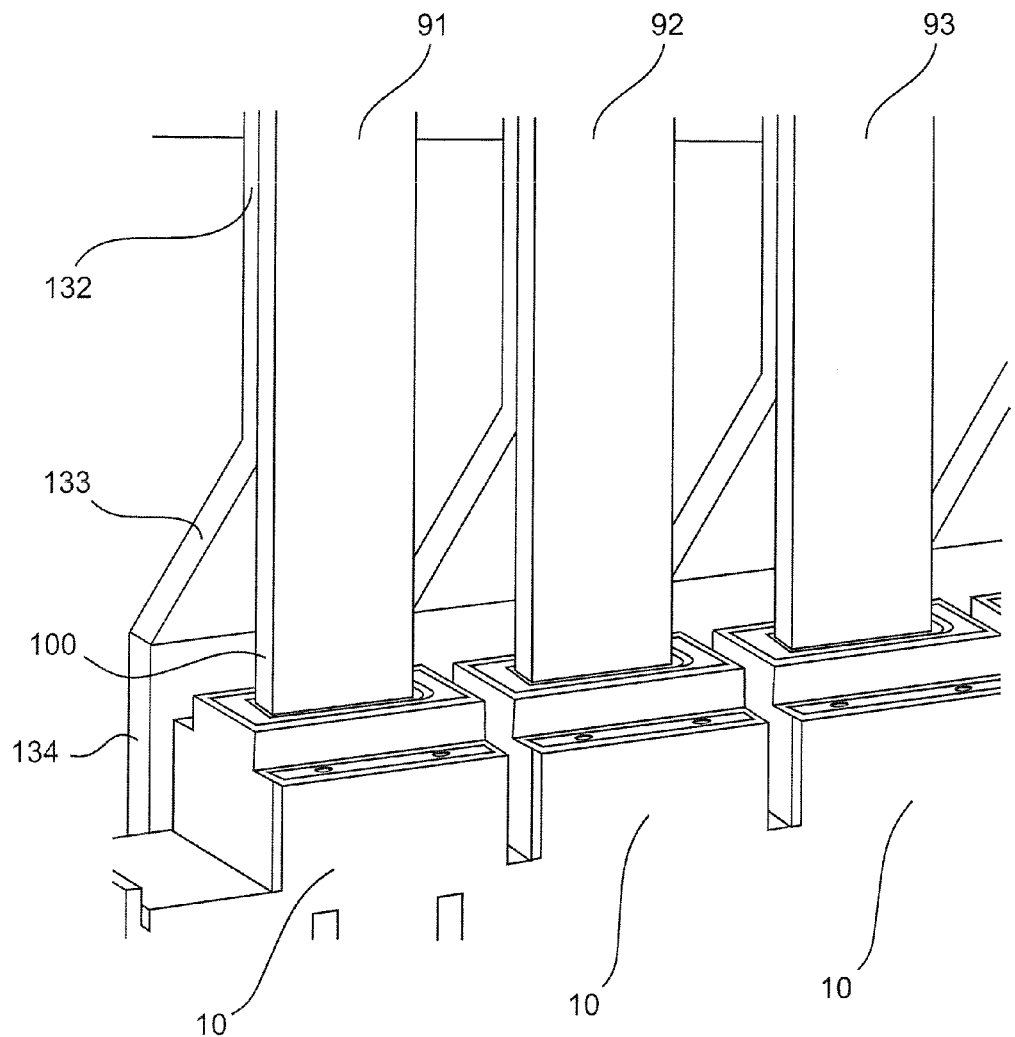
FIG. 3 shows a perspective view of busbar elements and clamping holders.

FIG. 3 shows a perspective view of the clamping holders 10, according to an embodiment, which are mounted in the end region of the associated pylon segment 21, 22, that is the lower end region in the constructed condition, shown from the wall of the pylon viewing into the interior thereof. The busbar elements 91-94 are clamped or inserted with their end portion 100 into those clamping holders 10. It can also be seen that the upper end regions 132 of the connecting elements 13 bear against the lower end portions 100 of the busbar elements 91-94. In that case the end regions 132 can be fixed in the end portions of the busbar elements 91-94 by screwing or other suitable connections.

Figure 4:
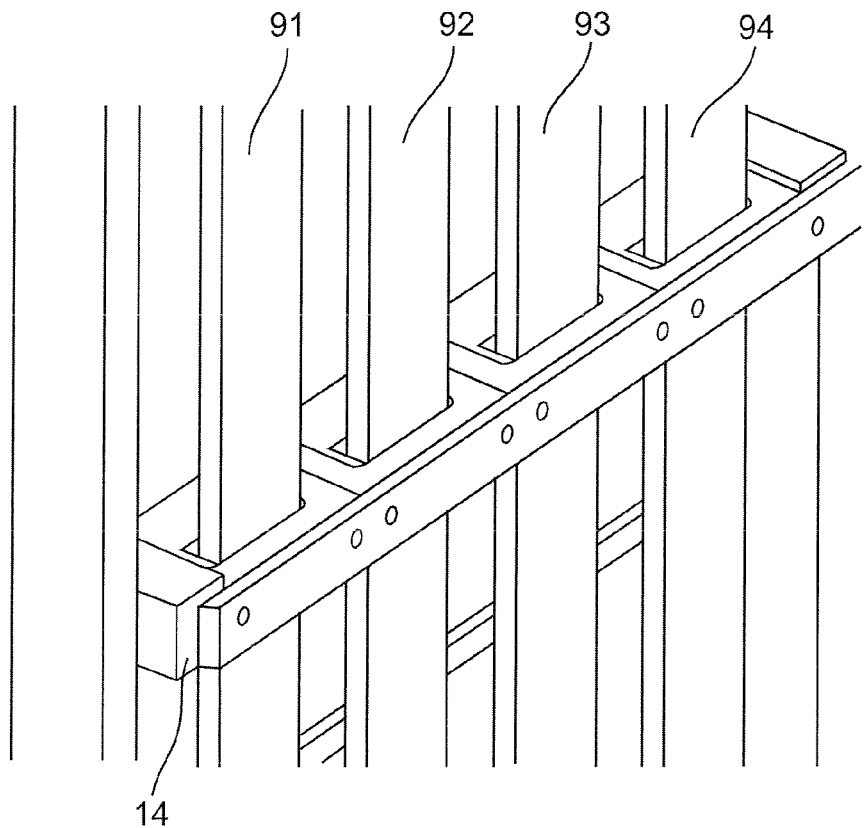
FIG. 4 shows a perspective view of busbar elements and holding elements.

FIG. 4 shows a perspective view of the busbar elements 91-94. According to the embodiment illustrated in FIG. 4, it can be seen that the busbar elements 91-94 can be additionally secured to prevent them from falling over by means of holding elements 14, in the end region of the associated pylon segment 21, that is the upper end region in the constructed condition. Such holding elements 14 can also guide the busbar elements 91-94 over the entire length thereof. For that purpose the cross-section of the opening for the busbar elements 91-94 in the holders 14 can be larger than the cross-section of the busbar elements 91-94 themselves. That permits a relative movement of the busbar elements 91-94 in the holding elements 14 and at the same time the busbar elements 91-94 are guided and held at their determined positions.

It is also possible to provide insulating means for insulating the busbar elements 91-94 with respect to the holding elements 14. It will be appreciated that alternatively the holding elements 14 themselves can also be made from an insulating material. The holding element 14 itself is fixedly connected to the inside wall of the pylon segment 21, for example by screwing.

Figure 5:
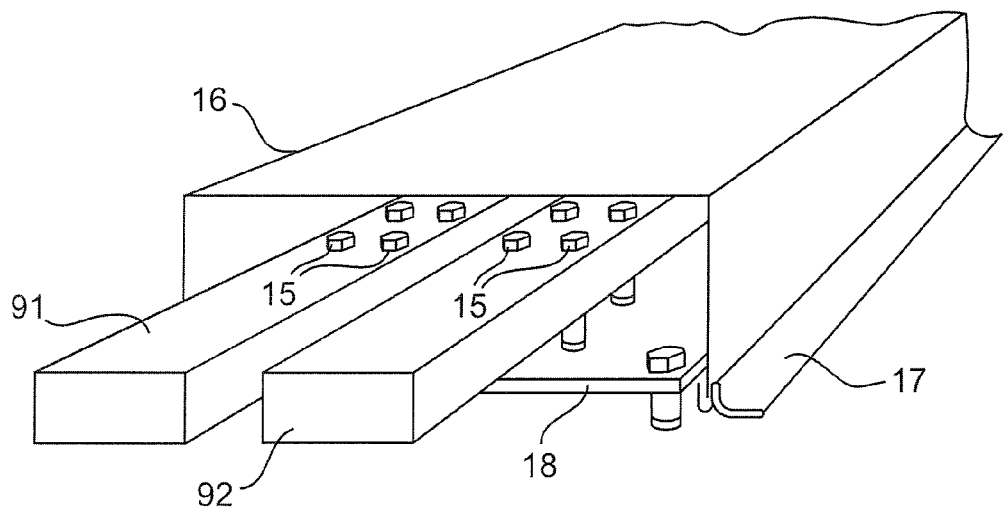
FIG. 5 shows a diagrammatic view of busbar elements and a protective plate.

FIG. 5 is a diagrammatic view of busbar elements 91, 92 of a pylon segment, that are installed in a pylon segment (not shown). To protect the busbar elements 91, 92 from contact in operation of the wind power installation there is a protective plate or casing 16 which like the busbar elements 91, 92 can also already be fitted into the individual pylon segments before the pylon 2 is erected. The protective plate or casing 16 is fixed on the one hand and insulated with respect to the pylon segment on the other hand by means of a guide rail 17 which for example can comprise a strong rubber. To fix the protective plate 16 however it is also possible to provide other means which are known in the state of the art and which are not shown here. In the illustrated embodiment of FIG. 5, holding means are in the form of screws 15 with which the busbar elements 91, 92 are mounted to the inside wall of the pylon or to a spacer plate 18.

In addition further devices such as plug sockets, lamps and so forth can be fitted in and/or on those protective plates 16 provided as protective casings so that they can also be easily installed. In addition in particular fitting those devices into the protective casing 16 avoids exposed mounting on the inside wall of the pylon and thus leads to a reduced risk of damage, for example due to objects dropping down during and after erection of the pylon.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A wind power installation comprising:
a pylon made up of a plurality of pylon segments;
a generator arranged in an upper region of the pylon;
a power module arranged in a lower region of the pylon or separate from the pylon;
busbar elements installed on associated pylon segments for current transfer from the generator to the power module;
connecting elements fixed at a first end to the busbar elements, respectively, the connecting elements being for connecting the busbar elements on adjacent pylon segments together, wherein the connecting elements are biased such that a second, free end of each connecting element bears against or is pressed against an end portion of a respective one of the busbar elements of an adjacent pylon segment; and
at least one clamping holder mounted to an inside wall in a lower end region of each of the pylon segments, end portions of the busbar elements of each associated pylon segment clamped or inserted into a corresponding one of the clamping holders.

2. A wind power installation according to claim 1 wherein the connecting elements are part of the busbar elements.

3. A wind power installation according to claim 1 wherein the connecting elements are separate parts from the busbar elements.

4. A wind power installation according to claim 1 wherein the connecting elements are respectively arranged at a lower end portion of the busbar elements of an associated pylon segment.

5. A wind power installation according to claim 1 wherein the connecting elements are respectively arranged at an upper end portion of the busbar elements of an associated pylon segment.

6. A wind power installation according to claim 1 wherein at least one end portion of the connecting elements can be respectively fitted together with or clamped together with an upper end portion of the busbar elements.

7. A wind power installation according to claim 1 wherein the connecting elements are bent or angled away from an inside wall of the pylon into the interior thereof to bridge over flanges of adjacent pylon segments.

8. A wind power installation according to claim 1 wherein the busbar elements of an associated pylon segment are additionally secured by means of holding elements to prevent them from falling over at an upper end region of the associated pylon segment.

9. The wind power installation according to claim 1 wherein the busbar elements installed on associated pylon segments are pre-installed on the associated pylon segments at a location remote from a building location of the wind power installation.

10. A pylon segment for a wind power installation, the pylon segment comprising:
a tubular body;
busbar elements coupled to the tubular body configured to transfer current from a generator arranged in an upper region of the wind power installation to a power module via the pylon segment;
connecting elements having first ends fixed to the busbar elements and second ends, the connecting elements coupling the busbar elements of the pylon segment to like busbar elements on adjacent pylon segments of the pylon, wherein the second ends of the connecting elements are biased such that the second end of each connecting element bears against or is pressed against an end portion of a respective one of the like busbar elements of the adjacent pylon segment; and
clamping holders mounted to an inside wall of the tubular body in a lower region of the pylon segment to receive end portions of the busbar elements.

11. The pylon segment according to claim 10 wherein the busbar elements coupled to the tubular body are coupled to the tubular body at a location remote from a building location of the wind power installation.

12. A method for erecting a wind power installation, the method comprising:
coupling bus bar elements to each of a plurality of pylon segments by positioning an end of each bus bar element of a corresponding pylon segment in a respective clamping holder mounted to a lower end region of the corresponding pylon segment;
positioning the pylon segments together to form a pylon of the wind power installation; and
coupling a first end of the connecting elements to the bus bar elements of the plurality of pylon segments, wherein coupling the first end includes coupling a second end of the connecting elements to an adjacent pylon segment of the plurality of pylon segments due to the connecting elements being biased towards the adjacent pylon segment, wherein the connecting elements connect the bus bar elements of first and second pylon segment together to form continuous conductive paths along a length of the pylon.

13. The method of claim 12 wherein coupling bus bar elements to each of the plurality of pylon segments includes coupling bus bar elements to each of the plurality of pylon segments at a location remote from a building location of the wind power installation.

* * * * *